(12) United States Patent
Whipple et al.

(10) Patent No.: US 7,607,878 B2
(45) Date of Patent: Oct. 27, 2009

(54) ANTI-VIBRATION/ROTATION DEVICE FOR SPLIT BOLTS

(75) Inventors: Charles E. Whipple, Collierville, TN (US); Cong Thanh Dinh, Collierville, TN (US); Jerry A. Woodward, Collierville, TN (US)

(73) Assignee: Thomas & Betts International, Inc., Wilmington, DE (US)

( * ) Notice: Subject to any disclaimer, the term of this patent is extended or adjusted under 35 U.S.C. 154(b) by 413 days.

(21) Appl. No.: 11/119,613

(22) Filed: May 2, 2005

(65) Prior Publication Data

US 2005/0249571 A1 Nov. 10, 2005

Related U.S. Application Data

(60) Provisional application No. 60/569,579, filed on May 10, 2004.

(51) Int. Cl.
*F16B 39/06* (2006.01)
*F16B 39/10* (2006.01)
*F16B 35/04* (2006.01)

(52) U.S. Cl. .................. 411/221; 411/216; 411/122; 411/418

(58) Field of Classification Search ............... 411/221, 411/216, 122, 418
See application file for complete search history.

(56) References Cited

U.S. PATENT DOCUMENTS

| | | | |
|---|---|---|---|
| 574,256 A * | 12/1896 | McCann | 411/201 |
| 680,118 A * | 8/1901 | Braley et al. | 411/201 |
| 922,721 A * | 5/1909 | Ross | 411/201 |
| 1,077,080 A * | 10/1913 | Jones | 411/201 |
| 1,115,923 A * | 11/1914 | Goble | 411/201 |
| 1,183,729 A * | 5/1916 | Hazel | 411/201 |
| 1,188,187 A | 6/1916 | Lewis | |
| 1,210,736 A | 1/1917 | Wallace | |
| 1,333,495 A | 3/1920 | Kilpatrick et al. | |
| 1,440,938 A * | 1/1923 | Sieroslawski | 411/221 |
| 1,480,885 A * | 1/1924 | Grossmann | 411/201 |
| 1,663,393 A * | 3/1928 | Snyder | 411/201 |
| 1,677,783 A * | 7/1928 | Kearney | 439/780 |
| 1,873,559 A * | 8/1932 | Dibner | 403/396 |
| 2,180,931 A | 11/1939 | Rogoff | |
| 2,450,158 A * | 9/1948 | Pennell | 439/431 |
| 2,471,957 A * | 5/1949 | Hubbard | 439/778 |
| 2,597,037 A | 5/1952 | Runde | |
| 2,830,353 A | 4/1958 | Barlow | |
| 2,844,808 A | 7/1958 | East | |
| 3,052,868 A | 9/1962 | Margolies | |
| 3,298,072 A | 1/1967 | Whalen | |
| 3,464,474 A * | 9/1969 | Jansen | 411/216 |
| 4,147,446 A | 4/1979 | Frank, Jr. | |
| 4,472,095 A * | 9/1984 | Molina | 411/304 |
| 5,129,844 A * | 7/1992 | Goto et al. | 439/778 |
| 6,095,735 A * | 8/2000 | Weinstein et al. | 411/221 |
| 6,976,816 B2 * | 12/2005 | Slesinski et al. | 411/122 |

* cited by examiner

*Primary Examiner*—Victor Batson
*Assistant Examiner*—David C Reese
(74) *Attorney, Agent, or Firm*—Hoffmann & Baron, LLP (57) ABSTRACT

A retaining device for a split bolt connector which includes: a continuous wall that defines an aperture and at least one bendable tab extending upwardly from the wall or a member extending between opposing wall sections. The wall is adapted to accommodate the nut on a split bolt connector in the aperture and the at least one tab, or the member, is adapted to engage the slot in the split bolt after the nut is connected to the split bolt.

20 Claims, 5 Drawing Sheets

ANTI-VIBRATION/ROTATION DEVICE FOR SPLIT BOLTS

This application claims priority from provisional application Ser. No. 60/569,579, filed on May 10, 2004.

FIELD OF THE INVENTION

The present invention relates to split bolt connectors, also known as U-, slotted or bifurcated bolt connectors. In particular, the present invention relates to a device for preventing split bolt connectors from loosening as a result of vibration or changes in temperature.

BACKGROUND OF INVENTION

Split bolt connectors of different designs are well known and have a variety of uses, for example, for the connection of conductor ends. Split bolt connectors are widely used in the various electrical industries because of convenience, low price and the ability of a single size connector to be used with a wide range of different size conductors. These connectors allow electrical conductors to be connected quickly and easily and have supplanted the twisted or soldered connections formerly used.

One of the problems with the split bolt connectors presently in use is that the nut has a tendency to become loose over time due to a number of factors, such as vibration and thermocycling, i.e. changes in ambient temperature. This can result in the degradation of the electrical connection or separation of the two conductors. One solution to this problem is routine maintenance during which the split bolt connector is monitored to check that the nut has not loosened in use and is still tightly secured to the bolt. If necessary, the nut can be tightened. However, frequent maintenance inspections can be expensive and continuous tightening can result in excessive wear and eventual stripping of the nut. Therefore, there is a need for a device that keeps the nut on a split bolt from loosening and also a device that protects the nut so that it is not stripped when tightened.

SUMMARY OF THE INVENTION

In accordance with the present invention, a retaining device for a split bolt connector (also referred to herein as the split bolt assembly) is provided. The split bolt connector includes a split bolt having a bolt head, two legs extending therefrom defining a slot and a nut. In preferred embodiments, the retaining device includes a multi-sided cap or body formed by a wall having a plurality of adjoining wall sections and one or more tabs extending upwardly from the wall, or a member extending between opposing wall sections. The adjoining wall sections define an aperture which is sized to snugly fit the nut of a split bolt connector. The cap is fitted over the nut of the split bolt connector and at least one of the tabs is bent into and engages the slot. This prevents the nut from rotating and prevents the split bolt connector from loosening.

In another preferred embodiment, a retaining device is provided for a split bolt connector assembly, wherein the assembly includes a nut having a plurality of flats and a split bolt having a slot. The retaining device includes: a wall which defines an aperture and has an interior surface and an exterior surface; and at least one tab extending upwardly from the wall. The wall is adapted to accommodate the nut in the aperture and the at least one tab is adapted to engage the split bolt. Preferably, at least one tab is adapted to frictionally engage the slot of the split bolt. The tab is bendable so that it can be easily repositioned to engage the split bolt.

In other preferred embodiments, the wall of the retaining device is formed by a plurality of adjoining wall sections and, preferably, from four to eight adjoining wall sections which are substantially flat and correspond to the flats of the nut. In a most preferred embodiment, every second adjoining wall section has a tab extending upwardly therefrom. The wall can also include one or more ribs extending inwardly from the interior surface of the wall to provide a snug fit when the retaining device is positioned on a nut. In addition, the wall sections and tabs can be formed from a malleable metal which makes it easier to snugly fit the retaining device to the nut. The plurality of adjoining wall sections are connected by a plurality of corners which correspond to the corners of the nut. In the most preferred embodiments, the adjoining wall sections are substantially flat and disposed in relation to each other at an angle of 45, 60 or 90 degrees.

In another embodiment, a retaining device is provided for a split bolt connector assembly that includes a split bolt and a nut. The retaining device includes: a continuous wall which defines an aperture; and at least one tab extending upwardly from the wall. The aperture is adapted to accommodate the nut in the aperture and the at least one tab is adapted to engage the split bolt after the nut is connected to the split bolt. The continuous wall snugly fits the flats of the nut so that the retaining device is securely attached to the nut. Preferably, the tab is bendable and the split bolt has a slot so that one or more of the tabs can be adapted to engage the slot, most preferably in a frictional manner. The term "continuous wall" refers to a wall with its ends joined together so that it surrounds and encloses the aperture.

The continuous wall preferably includes from four to eight adjoining wall sections and from two to four tabs and, most preferably, the continuous wall includes six adjoining wall sections and three tabs. In preferred embodiments, the adjoining wall sections are substantially flat and the length of the wall sections is substantially the same. In addition, the distance between the substantially flat, exterior surfaces of opposing wall sections is selected to accommodate standard wrench sizes, for example, the distance can be ⅜, 7/16, ½, 9/16, ⅝, 11/16, ¾, 13/16, ⅞, 1, 1¼, 1½, 1¾ or 2 inches. In other preferred embodiments, the distance between the substantially flat, exterior surface of opposing wall sections can be from 10 mm to 50 mm.

In another embodiment, a retaining device is provided for a split bolt connector assembly which includes a nut having a plurality of flats and a split bolt having a slot. The retaining device includes: a wall defining an aperture and having an interior surface and an exterior surface and four, six or eight adjoining walls sections, wherein the adjoining wall sections are substantially flat; a plurality of corners connecting the adjoining wall sections; a bendable tab extending upwardly from at least one wall section; and one or more ribs extending inwardly from the interior surface of the wall. The wall sections and corners are adapted to accommodate the nut and one or more tabs is adapted to engage the split bolt.

A preferred embodiment of the retaining device for a split bolt connector assembly, wherein the assembly includes a nut having a plurality of flats and a split bolt having a slot, includes a wall defining an aperture and having a plurality of opposing wall sections; and a member extending between two opposing wall sections. The wall is adapted to accommodate the nut in the aperture and the member is adapted to be received by the slot of the split bolt. The wall can have six opposing wall sections and the wall and member can be formed from a malleable metal or a plastic material. The member can extend upwardly from the opposing wall sections to provide additional clearance above the nut after it is secured to the split bolt.

BRIEF DESCRIPTION OF THE FIGURES

Other objects and many attendant features of this invention will be readily appreciated as the invention becomes better understood by reference to the following detailed description when considered in connection with the accompanying drawings wherein.

DETAILED DESCRIPTION OF THE INVENTION

The present invention is a retaining device for a split bolt connector (also referred to herein as a split bolt assembly) which prevents the backing off or loosening of the nut due to vibration or thermocycling. When placed over an existing nut of a split bolt connector, the retaining device increases the distance between the flats of a nut by the thicknesses of the walls so that standard open end wrench sizes can be used to tighten the nut. The retaining device includes a body with a continuous wall made up of a plurality of wall sections which fits around a nut so that the interior walls of the body correspond and are in close relation to the flats of the nut. In preferred embodiments, the nut is a hexagonal nut. The retaining device also includes one or more bendable tabs which extend upwardly from the body. After the body is positioned snugly on the nut so that the interior wall sections correspond to the flats of the nut, at least one of the tabs is bent into the slot formed by the two legs of the split bolt. This locks the nut in position and prevents it from rotating.

In a preferred embodiment, the retaining device is a tin plated cap which has a continuous wall having a plurality of adjacent wall sections and at least one bendable tab or pressure bar extending upwardly from at least one of the wall sections. The continuous wall defines an aperture and the plurality of adjoining wall sections correspond to the flats of a nut for a split bolt connector. After the body is press-fitted over the nut, the tab or tabs are bent over or crimped so that they engage the split bolt. Preferably, one tab is bent over into the opening between the two legs of the split bolt and crimped into the threaded portion of the nut. The other tab or tabs can optionally be crimped into the threaded portion of the bolt.

The cap is preferably made from a malleable metal but can be made from a variety of metals, including copper, brass, aluminum, steel or other metals known in the art. The criteria for selecting the metal is that it must be strong enough so that the substantially flat sections of the wall, also referred to herein as wall sections, adjoining walls sections or side wall sections, are not easily stripped or deformed by a wrench and malleable enough so that the tabs can be bent either manually or with a tool. The outside walls of the body conform to standard wrench sizes (for example, ½, ⅝, ¾ or ⅞, 1-inch and larger) which allows a standard open end wrench to be used to engage the outer walls of the body and tighten the nut, rather than an adjustable wrench which could slip and damage the outer walls of the body. However, the size of the body is not limited and it can be any size. The size is only dependent upon the size of the nut used on the split bolt.

In a preferred embodiment, the retaining device of the present invention is a hexagonal cap assembly or "hex cap" (also referred to herein as "the body") that is positioned over the hex nut after the hex nut is secured to the split bolt. The tabs of the hex cap can be bent with the user's fingers or a tool, such as a screwdriver or pliers. The tab is bent inwardly into the slot of the split bolt after the hex nut has been tightened in order to lock the nut into place and to prevent the nut from becoming loose.

In another preferred embodiment, the retaining device is a hexagonal cap assembly wherein the body wall or cap is formed by a plurality of adjoining wall sections, preferably six adjoining wall sections, and a member extends between two of the opposing wall sections. The member is used in place of tabs to secure a nut to a split bolt. The cap assembly is fitted over the split bolt after the nut has been tightly secured to the bolt with the member positioned in the slot between the legs of the split bolt. The wall of the cap assembly snugly fits around the nut and the member prevents the nut from rotating. The cap and member can be formed from a metal, preferably a malleable metal, or a plastic material, preferably a hard plastic.

Figure 1:
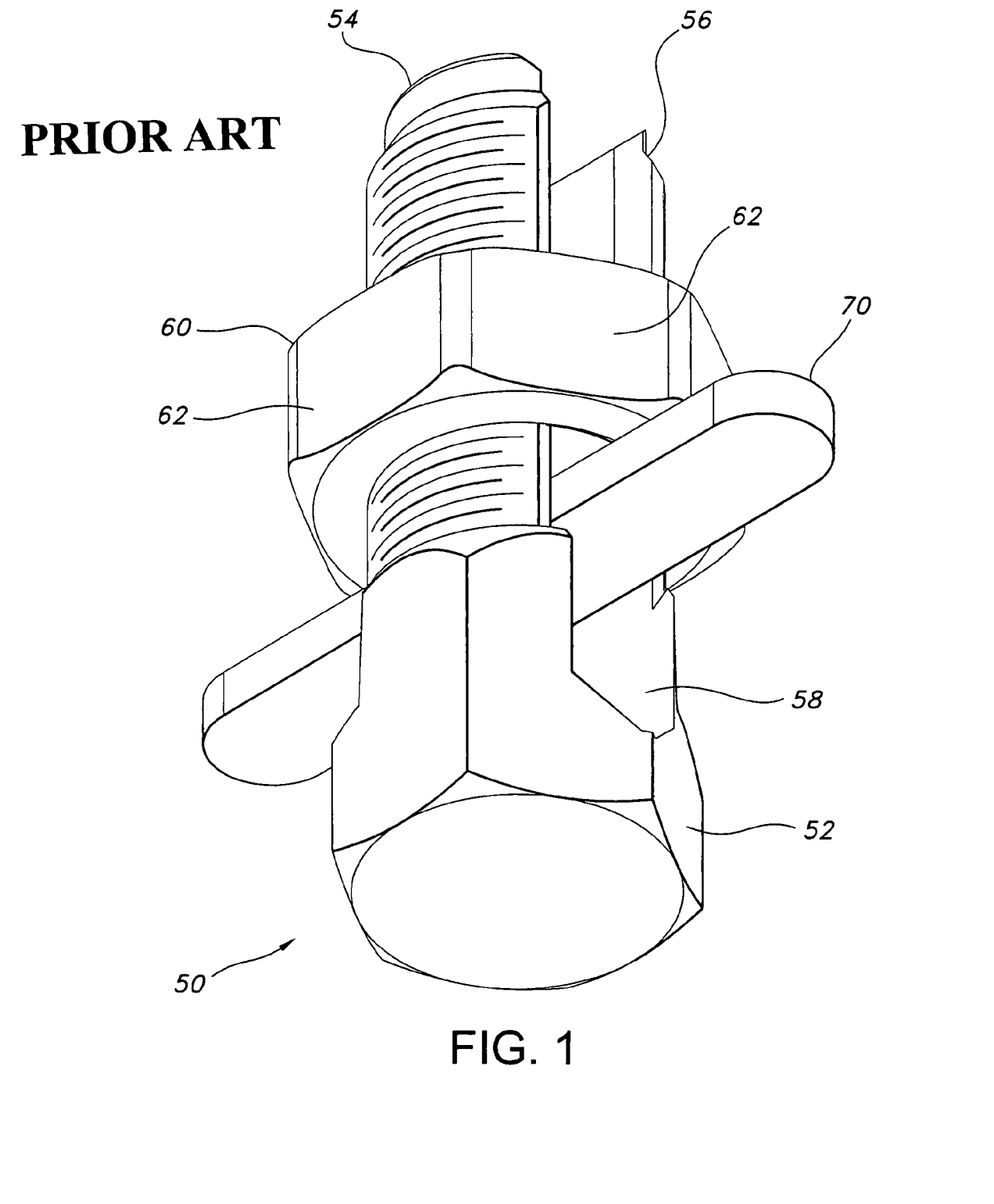
FIG. 1 shows a typical split bolt connector.

FIG. 1 shows a split bolt assembly which includes a split bolt 50 and a nut 60. The split bolt has a bolt head 52 and two legs 54, 56 extending therefrom to define a slot 58 between the legs 54, 56. The nut 60 has an exterior wall with a plurality of surfaces or flats 62. For example, a hexagonal nut 60 has six flats 62. Typically, two conductors (not shown) are placed in the slot 58 and the nut 60 is tightened to form a connection. In some split bolt assemblies, a pressure bar 70 is inserted in the slot 58 to protect the conductors from being damaged when the nut 60 is tightened.

Figure 2:
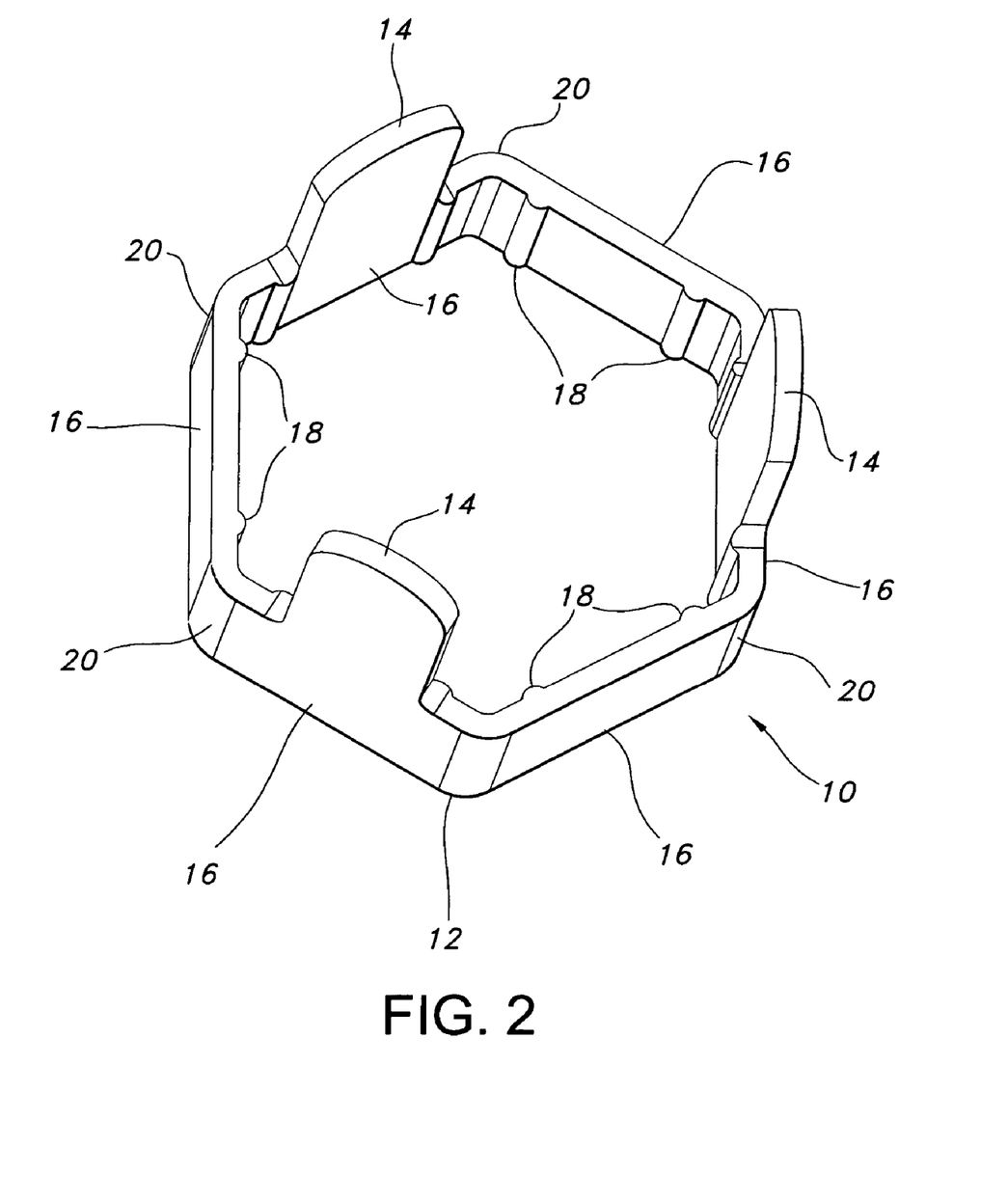
FIG. 2 shows an embodiment of the retaining device of the present invention with tabs extending upwardly from the wall sections.

FIG. 2 shows a preferred embodiment of the retaining device 10 of the present invention which includes a hexagonal-shaped cap or body 12 formed by six side wall sections 16. (Other embodiments of the invention can have a different number of side wall sections, such as four or eight.) The hexagonal-shaped body 12 is formed so that the distance between opposing flat surfaces of the side wall sections 16 of the body 12 correspond to standard wrench sizes. One or more tabs 14 extend upwardly from the side wall sections 16 and are, preferably, formed from a malleable metal so that they can be easily bent over.

FIG. 2 also shows a plurality of vertical ribs 18 extending from the interior surfaces of the side wall sections 16. These ribs 18 provide some flexibility in the side wall sections 16 and allow the retaining device 10 to snugly fit around the nut 60. The body 12 of the retaining device 10 also can have a plurality of corners 20 which connect the side wall sections 16. These corners 20 correspond to the corners of the nut 60 so that the interior surfaces of the wall sections 16 can be maintained in close proximity to the flats of the nut 60.

Figure 3:
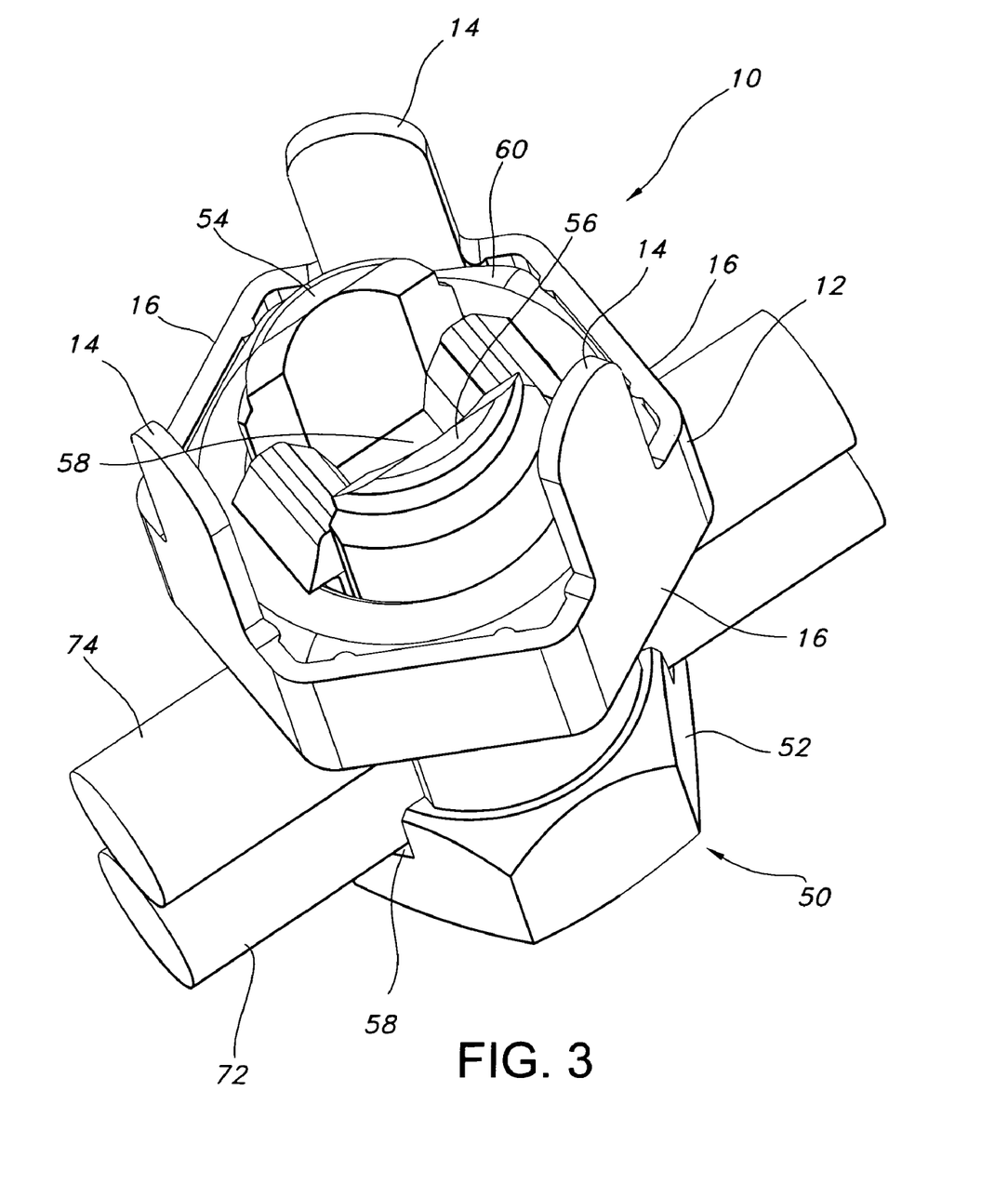
FIG. 3 shows an embodiment of the retaining device of the present invention with tabs mounted to a split bolt connector.

FIG. 3 shows the retaining device 10 of the present invention fitted to the nut 60 of a split bolt assembly. Two conductors 72, 74 are positioned in the slot 58 between the two legs 54, 56 of the split bolt 50 and the nut 60 is tightened until one of the flat surfaces of the nut 60 aligns with the slot 58. This compressively secures the conductors 72, 74 between the nut 60 and the bolt head 52. After the nut 60 is tightened, the body 12 of the retaining device 10 is fitted onto the nut 60 with the six wall sections 16 of the body 12 in close proximity to and in a corresponding relationship with the six flat surfaces of the nut 60. In this position, one of the tabs 14 is aligned with the slot 58. The tab 14 is then bent over so that it enters the slot 58 and engages one or both of the interior walls of the two legs 54, 56 of the split bolt 50 and/or the threads of the nut 60.

FIG. 3 illustrates how the retaining device 10 locks the nut 60 into a fixed position so that the nut 60 cannot rotate independently. When one of the tabs 14 is bent over and engages the slot 58 of the split bolt 50, the nut 60 is immobilized and secured in position. Once the retaining device 10 secures the nut 60, vibrations and thermal cycling will not cause the nut 60 to loosen. This assures that the conductors 72, 74 will remain electrically and mechanically connected. In the event that the conductors 72, 74 have to be disconnected, the tab 14 is disengaged from the slot 58 in the split bolt 50 with a tool, such as a screwdriver or a pliers, and the retaining device 10 is removed. The nut 60 is then free to rotate and can be untightened to free the conductors 72, 74 from the split bolt connector.

Figure 4:
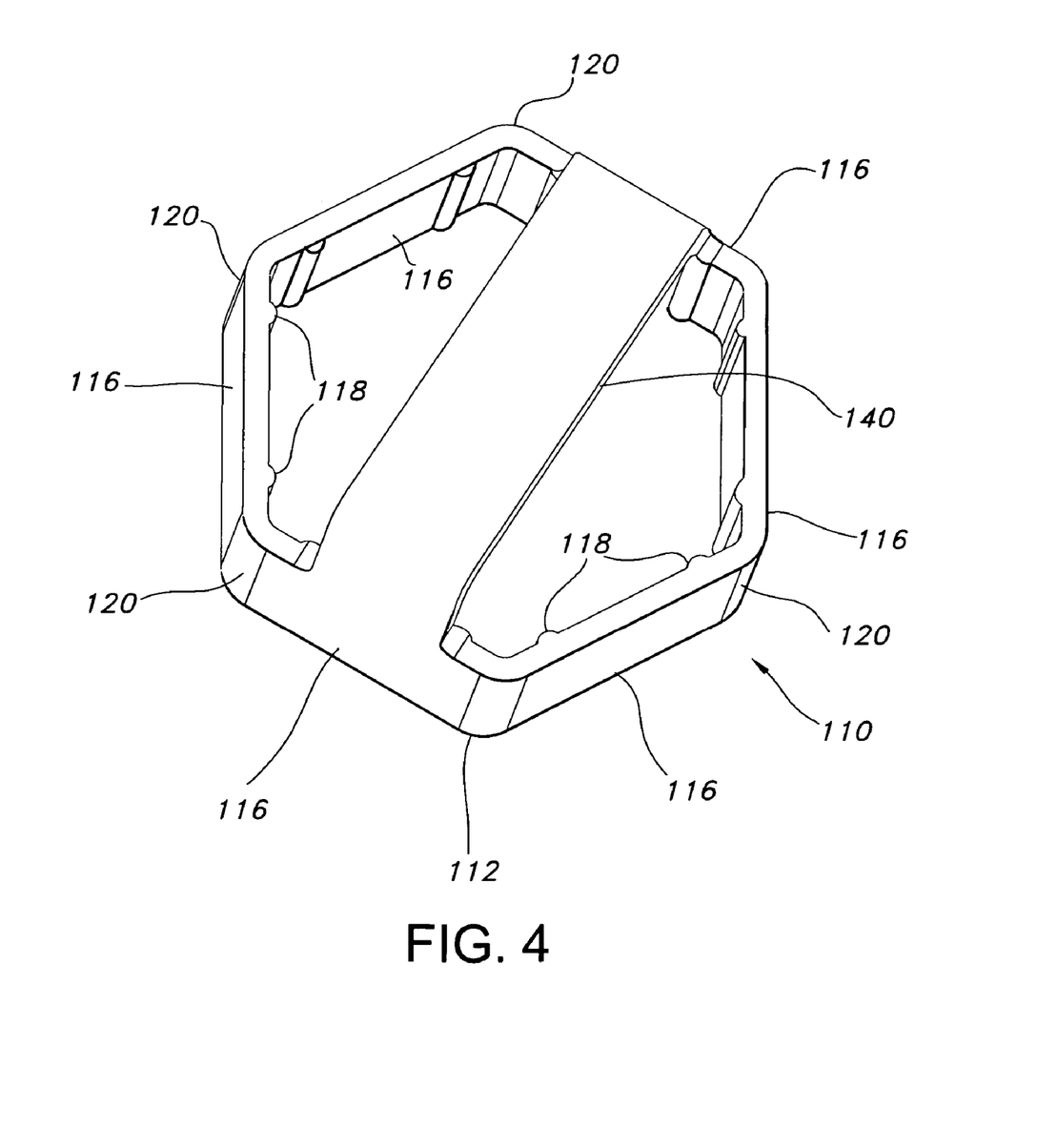
FIG. 4 shows an embodiment of the retaining device of the present invention with a member extending between opposing the wall sections.

FIG. 4 shows an embodiment of the retaining device 110 of the present invention which includes a hexagonal-shaped cap or body 112 formed by six side wall sections 116. (Other embodiments of the invention can have a different number of side wall sections, such as four or eight.) The hexagonal-shaped body 112 is formed so that the distance between opposing flat surfaces of the side wall sections 116 of the body 112 correspond to standard wrench sizes. The side wall sections 116 are connected by a plurality of corners 120 so that the side wall sections 116 and corners 120 form an aperture that conforms to standard size nuts. The side wall sections 116 can also have one or more ribs on the interior surfaces to provide a snug fit when the retaining device 110 is installed on a split bolt connector assembly. In addition, a member 140 extends between opposing side wall sections 116 and, preferably, the member extends between the top edge of the wall sections 116. In preferred embodiments, the member 140 extends upwardly from the side wall sections 116 and has an inverted "U" shape. The member 140 is adapted to be received by the slot between the legs of a split bolt after the nut has been secured to the split bolt and prevents the nut from rotating.

Figure 5:
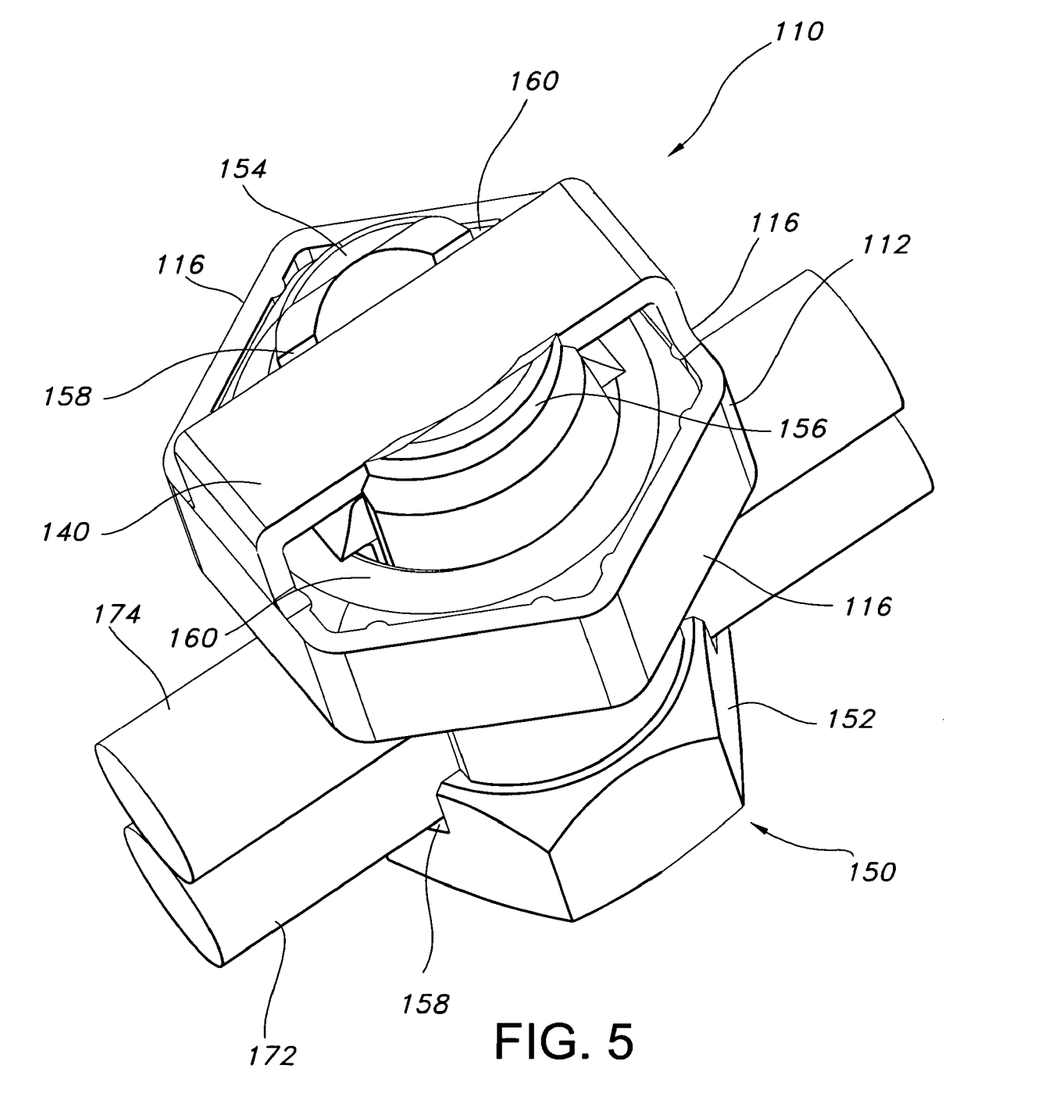
FIG. 5 shows an embodiment of the retaining device of the present invention with a member mounted to a split bolt connector.

FIG. 5 shows an embodiment of the retaining device 110 of the present invention, with a member 140 extending between opposing wall sections 116, fitted to the nut 160 of a split bolt assembly. Two conductors 172, 174 are positioned in the slot 158 between the two legs 154, 156 of the split bolt 150 and the nut 160 is tightened until one of the flat surfaces of the nut 160 aligns with the slot 158. This compressively secures the conductors 172, 174 between the nut 160 and the bolt head 152. After the nut 160 is tightened, the body 112 of the retaining device 110 is fitted onto the nut 160 with the six wall sections 116 of the body 112 in close proximity to and in a corresponding relationship with the six flat surfaces of the nut 160. The body 112 has a snap-on fit with the nut 160 so that it is stays in place after it has been pressed onto the nut 160. In this position, the member 140 is aligned with and received by the slot 158 between the two legs 154, 156 of the split bolt 150. When the body 112 of the retaining device 110 is pressed onto the nut 160, the member 140 is secured in the slot 158 and prevents the nut 160 from rotating and becoming loose. This ensures that the two conductors 172, 174 remain securely connected. In the embodiment shown in FIG. 5, the member 140 extends upwardly from, as well as between, the opposing wall sections 116.

Thus, while there have been described the preferred embodiments of the present invention, those skilled in the art will realize that other embodiments can be made without departing from the spirit of the invention, and it is intended to include all such further modifications and changes as come within the true scope of the claims set forth herein.

We claim:

1. A retaining device for a split bolt connector assembly, wherein the assembly includes a nut having a plurality of flats and a split bolt having a bolt head, a threaded end, a mid-portion and two cantilevered legs extending away from the bolt head which define a slot between the legs, wherein the slot extends from a base located in the mid-portion to an opening at the threaded end and wherein the slot defines the legs as independent structures between the base and the threaded end, the retaining device comprising:
    a continuous wall defining an aperture and having an interior surface and an exterior surface; and
    at least one tab extending upwardly from the wall,
    wherein the wall is adapted to accommodate the nut in the aperture and the at least one tab is adapted to engage the slot in the split bolt.

2. The retaining device of claim 1, wherein the wall comprises a plurality of adjoining wall sections.

3. The retaining device of claim 2, wherein the plurality of adjoining wall sections are substantially flat and correspond to the flats of the nut.

4. The retaining device of claim 1, wherein the at least one tab is bendable.

5. The retaining device of claim 1, wherein the wall comprises from four to eight adjoining wall sections.

6. The retaining device of claim 5, wherein every second adjoining wall section has a tab extending upwardly therefrom.

7. The retaining device of claim 1 further comprising one or more ribs extending inwardly from the interior surface of the wall.

8. The retaining device of claim 2, wherein the plurality of adjoining wall sections are connected by a plurality of corners.

9. The retaining device of claim 2, wherein the adjoining wall sections are disposed in relation to each other at an angle of 45, 60 or 90 degrees.

10. The retaining device of claim 1, wherein the wall and the at least one tab are formed from a malleable metal.

11. A retaining device for a split bolt connector assembly that includes a split bolt and a nut having a plurality of flats, wherein the split bolt has a bolt head, a threaded end, a mid-portion and two cantilevered legs extending away from the bolt head which define a slot between the legs, wherein the slot extends from a base located in the mid-portion to an opening at the threaded end and wherein the slot defines the legs as independent structures between the base and the threaded end, wherein the retaining device comprises:
    a continuous wall having an interior surface, wherein the wall defines an aperture; and
    at least one tab extending upwardly from the wall;
    wherein the wall is adapted to accommodate the nut in the aperture so that the interior surface corresponds and is in close proximity to the plurality of flats and the at least one tab is bent into the slot to engage the split bolt after the nut is connected to the split bolt.

12. The retaining device of claim 11, wherein the at least one tab is bendable.

13. The retaining device of claim 11, wherein the split bolt has a slot and wherein the at least one tab is adapted to engage the slot.

14. The retaining device of claim 11, wherein the continuous wall comprises from four to eight adjoining wall sections and from two to four tabs.

15. The retaining device of claim 11, wherein the continuous wall is comprised of six adjoining wall sections and three tabs.

16. The retaining device of claim 14, wherein the adjoining wall sections are substantially flat and the length of the wall sections is substantially the same.

17. The retaining device of claim 16, wherein the distance between the substantially flat, exterior surfaces of opposing wall sections is ⅜, 7/16, ½, 9/16, ⅝, 11/16, ¾, 13/16, ⅞, 1, 1¼, 1½, 1¾ or 2 inches or from 10 mm to 50 mm.

18. A retaining device for a split bolt connector assembly, wherein the assembly includes a nut having a plurality of flats and a split bolt having a bolt head, a threaded end, a mid-portion and two cantilevered legs extending away from the bolt head which define a slot between the legs, wherein the slot extends from a base located in the mid-portion to an opening at the threaded end and wherein the slot defines the legs as independent structures between the base and the threaded end, the retaining device comprising:

a continuous wall defining an aperture and having an interior surface and an exterior surface; and at least one tab extending upwardly from the wall, wherein the retaining device is installed on the nut after the nut is secured to the split bolt, wherein the wall is adapted to accommodate the nut in the aperture so that the interior surface corresponds and is in close proximity to the plurality of flats and wherein the at least one tab is adapted to engage the slot in the split bolt.

19. The retaining device of claim 18, wherein the wall comprises a plurality of substantially flat adjoining wall sections connected by a plurality of corners.

20. The retaining device of claim 18, further comprising one or more ribs extending inwardly from the interior surface of the wall.

* * * * *

UNITED STATES PATENT AND TRADEMARK OFFICE
CERTIFICATE OF CORRECTION

PATENT NO. : 7,607,878 B2
APPLICATION NO. : 11/119613
DATED : October 27, 2009
INVENTOR(S) : Whipple et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 422 days.

Signed and Sealed this

Twelfth Day of October, 2010

David J. Kappos
*Director of the United States Patent and Trademark Office*